March 7, 1950 J. J. BLACK 2,500,021
ROOF BOW FOR HIGHWAY VEHICLES
Filed Nov. 15, 1945
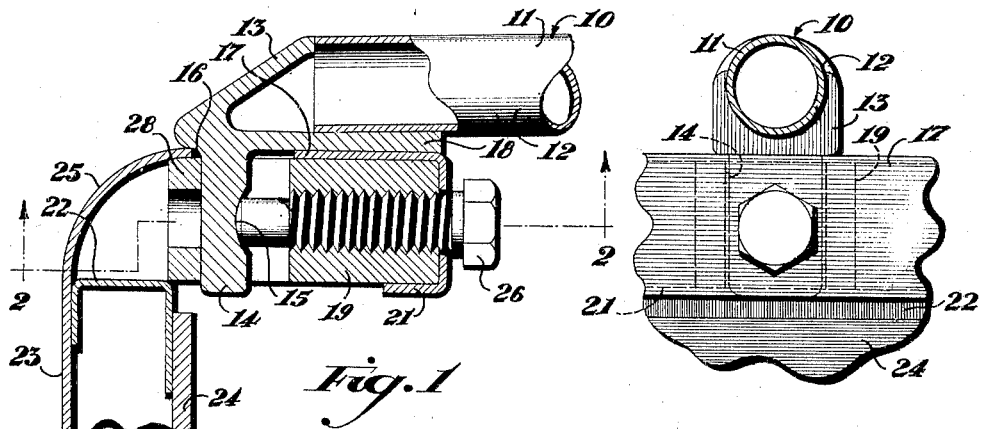
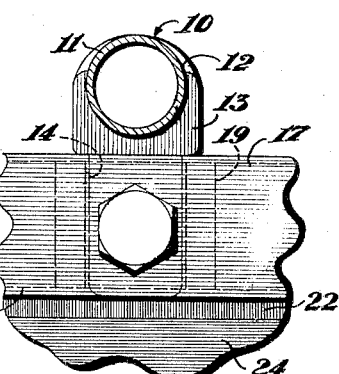
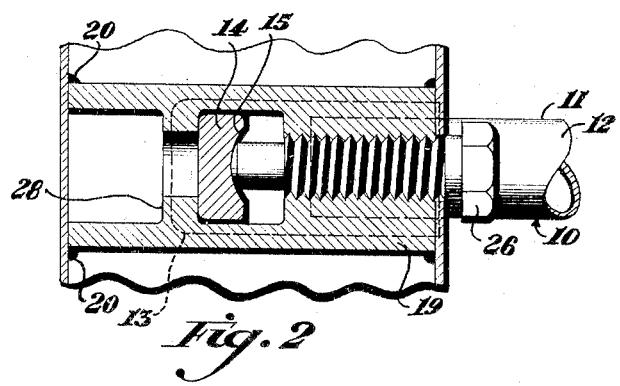
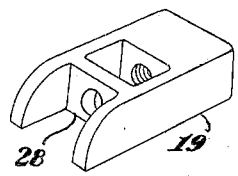
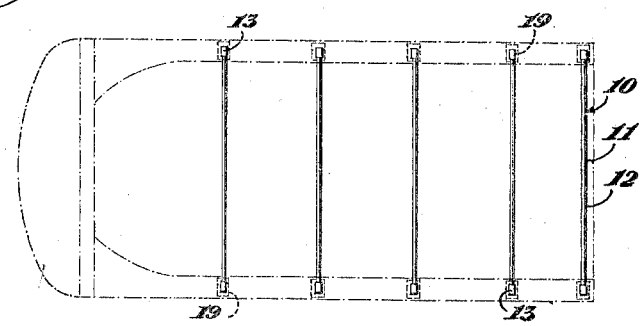
INVENTOR.
James J. Black
BY
Wood, Arey, Herron & Evans
ATTORNEYS Patented Mar. 7, 1950

2,500,021

UNITED STATES PATENT OFFICE 2,500,021

ROOF BOW FOR HIGHWAY VEHICLES

James J. Black, Cincinnati, Ohio, assignor to The Trailmobile Company, Cincinnati, Ohio, a corporation of Delaware Application November 15, 1945, Serial No. 628,699

7 Claims. (Cl. 296—137)

This invention relates to roof bows for highway vehicles such as trailers, trucks and the like, and is particularly concerned with an improved type of structure by means of which it is possible to obtain a maximum degree of strength and efficiency with a minimum of effort in removal and replacement of the device.

In trailers and trucks of the open-top type it has been conventional to provide a plurality of roof bows extending transversely across the top at spaced points for the dual purpose of providing a seat for the conventional canvas top and preventing and correcting the outward spread of the side walls of the vehicle which invariably occurs as the result of loading and in the general use of the vehicle.

Since open-top vehicles are usually loaded from the top as by a crane it is important that the roof bows be removable selectively in order to permit the loading of heavy and bulky objects such as crates, boxes and the like. After the roof bows have been removed for purposes of loading or otherwise, it is essential that they be replaced as otherwise the side wall spread may become aggravated to a point where it is difficult to correct. For this reason, as a practical matter, it is necessary to provide roof bows which can be removed and replaced with little effort as otherwise the operator of the vehicle may neglect to replace them after removal and a damaging outward spreading of the side walls may occur. Another essential in roof bow construction is the provision of a certain degree of latitude in securing the bows in position, as when spreading has occurred the roof bow performs an important function in bringing the side walls back to their original vertical position. It should be noted additionally that in open top trailer and truck bodies of the type to which the invention has application the side walls tend to sway and vibrate transversely, being subjected to continuous and substantial sidewise pressures in the operation of the vehicle. These vibrations are transmitted to the cross bows which, if rigidly anchored to the walls, will serve to strengthen the entire structure and substantially prevent sway and vibration.

One of the objects of the present invention has been to provide a removable roof bow for highway vehicles in which a particularly strong and rigid construction has been provided in combination with a simplicity of construction and ease of operation.

Another object has been to provide a removable roof bow which permits great latitude in positioning on a vehicle in which the walls have spread and one in which the spreading can be corrected in a simple but very effective manner.

Another object has been to provide a roof bow construction in which a portion of the construction is built into the upper flange of the wall of the vehicle at certain selected and spaced points and only a portion of the entire roof bow unit is removable.

Another object has been to provide a roof bow construction incorporating means for rigidly clamping the opposite ends of the roof bow to respective side walls to tie the walls firmly together to rigidify the structure and prevent side sway and vibration.

Other and further objects and advantages will be apparent from the further and more detailed description of the invention when considered in conjunction with the drawings in which:

Figure 1 is a vertical sectional view of a portion of a roof bow representing a preferred embodiment of the invention secured in position on the side wall of a vehicle.

Figure 2 is a sectional view along the line 2—2, Figure 1.

Figure 3 is an end view of substantially the same portions of the roof bow and side wall as shown in Figures 1 and 2 looking outwardly from the center of the vehicle.

Figure 4 is a top plan view of a number of the roof bows of the invention in position on the body of a vehicle, the latter being shown in dotted lines.

Figure 5 is an end view similar to Figure 4.

Figure 6 is a perspective view of the nut element which forms a portion of the entire roof bow combination.

Referring again to the drawings for a further and more detailed description of the invention the combination of elements forming the roof bow which constitutes the preferred embodiment of the invention are indicated generally at 10, Figure 1. The roof bow proper has been designated as 11 and includes a bow member 12 which is adapted to extend transversely across the body of the vehicle in the manner illustrated in Figures 4 and 5 and a bracket member 13 which is preferably formed integrally with the bow member. The bracket includes a depending leg 14 having a cup-shaped depression 15 (not fully shown) formed centrally therein. This leg is adapted to be inserted into an opening 16 preformed in the laterally extending upper flange 17 of the side wall of the trailer. In inserted position the arm 18 of the bracket 13 extends inwardly of the side wall and rests on the side wall flange 17. This arm 18 also supports the bow member 11 which as shown is preferably of a hollow pipe construction.

As best seen in Figures 2 and 3, the leg 18 of the bracket member 13 constitutes a saddle or seat into which the end of the tubular bow member is fitted. In the preferred embodiment, the side walls of the arm 18 extend slightly above the widest portion of the bow 11 and embrace the complete lower half of the bow and part of the upper half. It will be observed that the endwise portion of the roof bow 11 is fitted longitudinally into the socket and is prevented from pulling upwardly and out of connection with the socket by the side walls of the arm 18 which embrace the upper part of the bow. A firm connection is thus established between the lug 14 and the bow 11 in the vicinity of that part of the bow which is subjected to great stress when the lugs are clamped to the side wall.

Prior to the insertion of the leg 14 of the roof bow in the preformed aperture in the flange as just described, a nut 19 has been inserted beneath the side wall flange 17 in the space between the inner bent-over portion of the flange and the side wall of the vehicle. This nut which forms an element of the roof bow combination may be rigidly secured to the flange as by welding 20 and may be supported at its under side by the turned-over lip 21 of the flange and at its outer extremity by the channel 22 which is rigidly secured between the side wall 23 of the vehicle and the inner wall 24. The upper and outer edge of the nut is curved as shown in Figure 6 and fits snugly against the curved wall portion 25 disposed between the side wall proper 23 and the side wall flange 17. Welding or other securing means may be utilized to hold the nut in position at one or more of these points.

As has been previously indicated, it is contemplated during the construction of the vehicle that a nut will be secured in position at each one of the points where it is desired to attach the end of a roof bow and will remain as a permanent installation on the vehicle.

In fastening the roof bow in position after the leg 14 has been inserted in the aperture 16 a screw 26 is threaded through the nut 19 until it engages in the cup-shaped depression 15 in the leg 14 of the bracket 13 and forces the leg against the inner surface of the nut portion 28 thus clamping it securely in position. As the roof bow is constructed the distance between the depending bracket legs 14 on each end of the roof bow is exactly that desired for the width of the vehicle between the two inner side walls 24 so that when the screw 26 has been tightened in the cup-shaped depression 15 on each side of the vehicle any spreading of the side walls which has occurred will be corrected to the extent that the side walls will be spaced apart the exact original distance. In addition, the roof bow will be secured very tightly in position.

It will be noted that in the preferred construction described the removable portion of the roof bow comprises only the portion which has been designated as 11 including the bow member 12 and two bracket members 13. This element is easy to remove and to handle and there are no moving parts which can get out of order or become broken during handling.

It will be apparent that the anchorage is not subject to wear and subsequent looseness after continued use of the vehicle since the screw 26 exerts a clamping action automatically compensating for any wear which may take place.

The entire construction is a simple one but very strong and sure in operation and effective for the purpose intended. Obviously, there are various changes and departures which can be made in the structure deviating from the preferred form herein shown and described without departing from the principles of the invention as set out in the ensuing claims.

Having described my invention, I claim:

1. In a body for highway vehicles and the like, a pair of side walls disposed longitudinally along opposite sides of said body, each of said side walls comprising a pair of panels in spaced relationship, a channel member disposed along an upper edge between the panels to hold the same in spaced relationship, one of said panels having a curved section extended upwardly along said channel member and spanning the space intervening between the panels to form a top closure therefor, a plurality of fastening blocks disposed in spaced relationship along each of said side walls, each of said blocks having an end shaped to conform to said curved panel section and arranged to be nested and secured between the curved panel section and said channel member respectively to hold the same in fixed relationship.

2. In a body for highway vehicles and the like, a pair of side walls disposed longitudinally along opposite sides of said body, each of said side walls comprising a pair of panels in spaced relationship, a channel member disposed along an upper edge between the panels to hold the same in spaced relationship, one of said panels having a curved section extended upwardly along said channel member and spanning the space intervening between the panels to form a top closure therefor, a plurality of fastening blocks disposed in spaced relationship along each of said side walls, each of said blocks having an end shaped to conform to said curved panel section and arranged to be nested and secured between the curved panel section and said channel member respectively to hold the same in fixed relationship, a plurality of roof bows adapted to span said side walls, said bows including means at opposite ends thereof cooperating with said fastening blocks to secure the bows to said blocks to hold the side walls in spaced relationship.

3. Bracing means for spacing non-rigid side walls of a vehicle and holding the side walls in desired spaced relationship, said means comprising; a rigid roof bow, a pair of lugs projecting laterally and rigidly from the roof bow and spaced to correspond to the desired spacing of the side walls, and a pair of adjustable clamps fixed respectively to the inner top surface of each side wall and engageable with the said bow lugs, whereby when said clamps are tightened on said lugs, said side walls are brought into correct spaced relationship as determined by the spacing of said lugs.

4. Bracing means for spacing non-rigid side walls of a vehicle and holding the side walls in desired spaced relationship, said means comprising; a rigid hollow member adapted to span the side walls, a pair of brackets fixed rigidly to the opposite ends of the said member and having laterally projecting rigid lugs, said lugs being spaced apart from one another to correspond to the desired spacing of the side walls, a pair of clamp blocks respectively fixed to the top inner surface of the side walls, said clamp blocks having apertures adapted to receive said lugs loosely, each of said clamps having a screw threadedly carried thereby in position to enter the aperture thereof and adapted for clamping engagement with an inner surface of one of said lugs disposed in the aperture.

5. Bracing means for spacing non-rigid side walls of a vehicle and holding the side walls in desired spaced relationship, said means comprising; a rigid bar adapted to span the side walls, a pair of lugs fixed rigidly to the opposite ends of said bar, said lugs being spaced apart from one another to correspond to the desired spacing of the side walls, a pair of clamping blocks respectively fixed to the top, inner surface of the side wall, said clamping blocks having apertures adapted to receive said lugs loosely, each of said clamps having a screw threadedly carried thereby in position to enter the aperture thereof and adapted for clamping engagement with the inner surface of one of said lugs disposed in the aperture, said screw being accessible for adjustment from the interior of said vehicle.

6. In a body for highway vehicles of the type having a pair of side walls disposed longitudinally along opposite sides of said body and a plurality of roof bows spanning said side walls, means for bracing said side walls and detachably fastening said roof bows to the side walls comprising; a bracket for each side wall, each of said brackets fixed longitudinally along the top of its respective side wall and constituting a stiffening rib therefor, each of said brackets having an upper ledge and a lower ledge, and a pair of clamping blocks for each roof bow, each of said blocks having an aperture, said ledges being spaced to support said clamping blocks therebetween, one block of each pair of clamping blocks fixed between the ledges of one bracket with the aperture of said block exposed to receive the end of a roof bow and the other block of each pair being fixed between the ledges of the other bracket with the aperture of said block exposed to receive the other end of the roof bow, each of said clamping blocks having means accessible from the interior of said body for detachably clamping the end of a roof bow in the aperture in said clamping block.

7. Bracing means for spacing non-rigid side walls of a vehicle and holding said side walls in desired spaced relationship, said means comprising; a detachable rigid roof bow adapted to span said side walls, said bow having a pair of lateral, rigidly projecting lugs, said lugs being arranged adjacent the ends of the bow in relation corresponding to the spacing desired between said side walls, flanges extending laterally inwardly from said side walls, said flanges having apertures adapted to receive said lugs loosely, a clamping block fixed to each of said flanges, each of said clamping blocks having an aperture aligned with the aperture in said flange, and defining a lug socket therewith and an adjustable screw adapted to enter said socket for engagement with the inner surface of a lug disposed therein, whereby adjustment of said screws into clamping engagement with said lugs causes said non-rigid side walls to be clamped in the desired spaced relationship as determined by the spacing of said lugs.

JAMES J. BLACK.

REFERENCES CITED

The following references are of record in the file of this patent:

UNITED STATES PATENTS

| Number | Name | Date |
| --- | --- | --- |
| 16,925 | Jennings | Mar. 31, 1857 |
| 450,158 | James | Apr. 14, 1891 |
| 780,141 | Thomas | Jan. 17, 1905 |
| 854,405 | Christianson | May 21, 1907 |
| 1,289,265 | Richard et al. | Dec. 31, 1918 |
| 1,394,798 | Speed | Oct. 25, 1921 |
| 1,491,857 | Heintz | Apr. 29, 1924 |
| 1,506,476 | Cullinan | Aug. 26, 1924 |
| 2,239,318 | Haberstump | Apr. 22, 1941 |
| 2,324,508 | Johnson | July 20, 1943 |